A. L. HATFIELD.
SPLIT PACKING RING.
APPLICATION FILED MAR. 3, 1919.
1,359,170.
Patented Nov. 16, 1920.
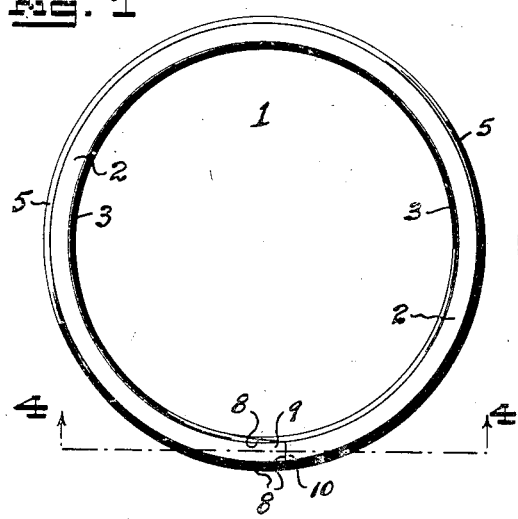
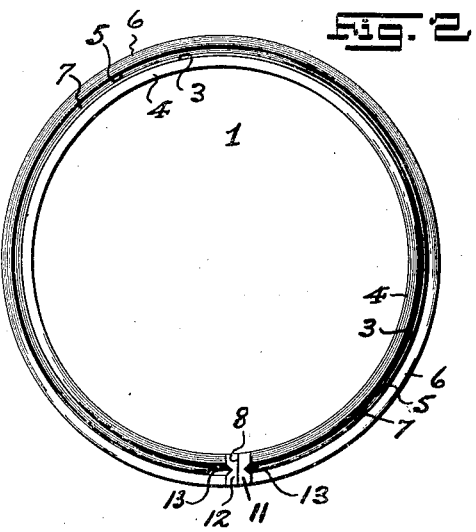
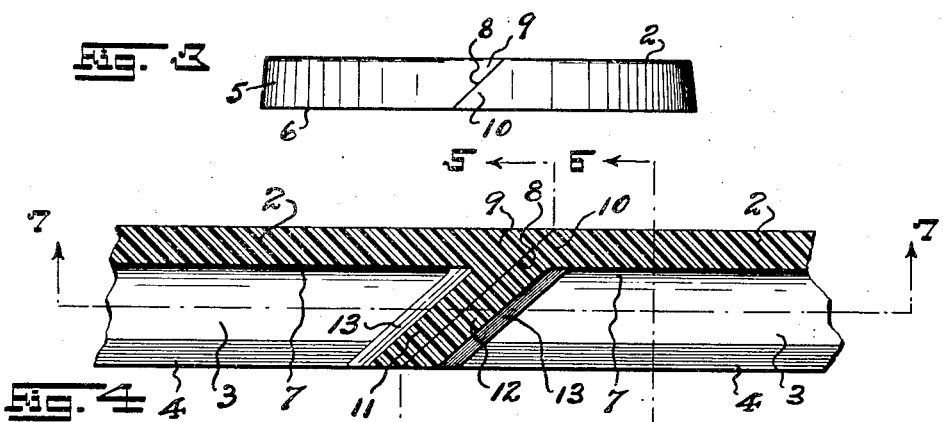
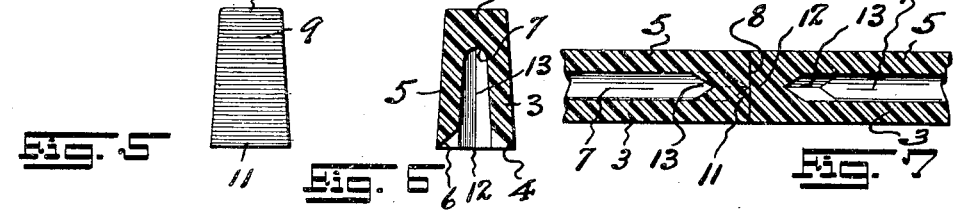
INVENTOR
Andrew L. Hatfield,
BY
Fraentzel and Richards,
ATTORNEYS

UNITED STATES PATENT OFFICE.

ANDREW L. HATFIELD, OF HILLSIDE, NEW JERSEY.

SPLIT PACKING-RING.

1,359,170.

Specification of Letters Patent.  Patented Nov. 16, 1920.

Application filed March 3, 1919. Serial No. 280,367.

*To all whom it may concern:*

Be it known that I, ANDREW L. HATFIELD, a citizen of the United States, residing at Hillside, in the county of Essex and State of New Jersey, have invented certain new and useful Improvements in Split Packing-Rings; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in packing rings for hydraulic presses, hydraulic elevators, and similar mechanisms; and the invention has reference, more particularly, to a novel construction of U-packing-rings preferably made of a suitable molded rubber composition, which may be easily applied to the mechanisms which they are to serve, and which, when so applied, provide a very efficient leak-proof packing.

It has long been customary to employ in connection with the cylinders and rams of hydraulic presses, and with the plungers of hydraulic elevators, a continuous packing-ring which is of inverted U-shaped cross-section, providing outer and inner concentric lips which spread laterally under the influence of the fluid pressure to which they are subjected, and are thus caused to hug the surfaces against which they are placed with a degree of tightness increasing proportionally to the amount of pressure applied, thus affording an excellent packing or obstruction against the leakage of the fluid employed with consequent loss of pressure efficiency or lifting power of the fluid employed. Such packing rings being made of leather or of a molded rubber composition. Owing to the U-shaped cross-section of the packing rings, it has been heretofore considered impractical to split the same without impairing their efficiency, and consequently such rings have been made in a continuous form. This continuity of the packing ring has always entailed considerable inconvenience when applying the same to the mechanisms with which they were to be employed, since it required more or less disassembling of the parts of such mechanisms in order to slip the packing rings into place. For example, in the case of the rams of hydraulic presses it is necessary to unhouse the same to enable the packing ring to be threaded over it, and in like manner, in the case of the plungers of hydraulic elevators it is necessary to disconnect the elevator car or platform from the end of the plunger, in order to slip the packing rings over the ends thereof, and then slide the same down into operative position. It is obvious that if the rings could be split, these difficulties would be in a great measure overcome, since the split ends of the ring could then be separated to admit the part to be encircled thereby, thus avoiding necessity of threading the rings axially over such part. If a U-shaped packing ring is so split transversely, I have found that the abutting ends, because of their U-shape and comparatively small surface area, are difficult and practically impossible to maintain in mutually registered abutment one with the other, and that consequent relative dislocation of such ends quickly opened a path for the escape of the fluid, thereby causing leaks detrimental to the operation and efficiency of the mechanisms involved, and of a character tending to increase with the wear to which the packing is submitted.

My present invention, therefore, has for its principal object to provide a construction of split packing-ring of general U-shaped cross-section, the split ends of which are so constructed and mutually associated as to eliminate the tendency to leakage at such point, so that the packing-ring provides all the efficiency of a continuous ring construction, together with the added convenience afforded by the split construction when applying the same in operative relation to the mechanism which it is to serve.

The invention is clearly illustrated in the accompanying drawing, in which:—

Figure 1 is a top plan view of the novel U-packing-ring, made according to and embodying the principles of my present invention; Fig. 2 is a bottom plan view of the same; and Fig. 3 is a side elevation of the same.

Fig. 4 is a detail vertical longitudinal section, taken on line 4—4 in said Fig. 1, and drawn on an enlarged scale; Fig. 5 is a transverse section through or between the split ends of the U-packing-ring, taken on line 5—5 in said Fig. 4; Fig. 6 is a transverse section taken on line 6—6 in said Fig. 4; and Fig. 7 is a horizontal section taken on line 7—7 in said Fig. 4.

Similar characters of reference are employed in all of the hereinabove described views, to indicate corresponding parts.

Referring now to said drawings, the reference character 1 indicates the complete novel construction of U-packing-ring made according to and embodying the principles of my present invention, the same being preferably made of a molded rubber composition, which material affords the best medium for securing the novel structural features or relation of parts involved in my invention. The said complete novel U-packing-ring 1 comprises a main body 2 of circular form. Integrally connected with the inner marginal edge of said body 2, so as to depend therefrom, is an inner annular flange 3 arranged to slightly incline or flare outwardly. The free marginal edge of said flange 3 is provided with an outwardly and downwardly chamfered portion providing an annular lip 4. In like manner, integrally connected with the outer marginal edge of said main body 2, so as to depend therefrom, is an outer annular flange 5 arranged to slightly incline or flare outwardly. The free marginal edge of said flange 5 is provided with an outwardly and downwardly chamfered portion providing an annular lip 6. Said flanges 3 and 5 are thus concentrically disposed with relation one to the other, and spaced apart to provide an intermediate channel or groove 7. Said body 2 and its flanges 3 and 5 are transversely split through in an oblique plane inclined from the perpendicular, as at 8, thereby providing a pair of separable, although normally mutually abutting ends 9 and 10. Integrally connected with said body 2 and the flanges 3 and 5 thereof, at its end 9 is a transversely disposed dam-member 11, the outer surface of which is flush with the plane of said split to provide a smooth meeting surface. In like manner, integrally connected with said body 2, and the flanges 3 and 5 thereof, at its end 10 is a transversely disposed dam-member 12, the outer surface of which is flush with the plane of said split to provide a smooth oppositely presented meeting surface. The respective dam-members close the ends of the channel or groove 7 otherwise exposed by the cut or split 8, against the escape of fluid from said channel or groove 7 into said split, and between the mutually abutting ends 9 and 10 thereof. The inner side of each dam-member 11 and 12 is provided with a V-shaped vertically disposed groove or notch 13 extending from the free edges of said dam-members to the bases thereof at their juncture with the main body 2. These V-shaped grooves or notches 13 are thus arranged to render easily accomplished the necessary lateral contraction of the dam-members when squeezing the packing-ring into its seat.

When the novel packing-ring is to be applied, as, for example, around the plunger of a hydraulic elevator, the ends 9 and 10 are separated so as to permit the plunger to pass therebetween, whereupon the packing-ring may be closed around the plunger, and then pressed down into its seat. When in normal operative position, the packing-rings are disposed with the groove or channel 7 presented to receive the pressure of the fluid flow, and the ends 9 and 10 are tightly closed together in mutually abutting relation. The necessary keeper mechanism for holding the packing in place is then secured in position to back the main body 2. Now as the pressure of the fluid is exerted against the packing, the said fluid enters the channel or groove 7, and being obstructed by the main body 2, presses laterally against the inner sides of the respective flanges 3 and 5, thereby forcing the inner flange 3 and its lip 4 tightly against the surface of the plunger, and, in like manner, forcing the outer flange 5 and its lip 6 tightly against the side of the packing-seat, whereby the fluid is retained against leaking away around the plunger or through said packing seat. The ends 9 and 10 being in closely and mutually abutting relation, the outer surfaces of the dam-members 11 and 12 are forced into tight mutual contact. The pressure of the fluid entering the groove or channel 7 is also directed against the inner or upper side of the dam-member 11, which by reason of its oblique disposition receives the pressure as a downwardly exerted force thereupon and at the same time the pressure of the fluid is also directed against the inner or under side of the dam-member 12, which by reason of its oblique disposition receives the pressure as an upwardly exerted force thereupon, consequently the said dam-members, under such fluid pressure, are constantly and strongly pressed toward each other, thereby sealing their outer faces together in tightly and mutually contacting relation, tending to easily resist the entrance therebetween of any fluid, and so preventing the escape of the fluid through the split 8. It will thus be apparent that the novel packing-ring having the novel separable end construction is readily adapted to provide all the usual advantages of the continuous U-packing-ring, but with the added advantage of affording much greater ease and convenience in assembling the same with the desired mechanism than a continuous U-packing-ring affords.

It will also be understood that my novel packing may be used in gangs one above the other, in which case, it is preferable to arrange the respective splits 8 thereof in staggered relation, one to another.

I claim:—

1. A packing-ring comprising a circular main body having integrally formed concentrically disposed side flanges providing an intermediate concentric channel, said body and its flanges being split transversely at one point to provide separable ends, and each end having an integrally formed transverse dam-member disposed across said channel to close the same.

2. A packing-ring comprising a circular main body having integrally formed concentrically disposed side flanges providing an intermediate concentric channel, said body and its flanges being split transversely and obliquely at one point to provide separable ends, and each end having an integrally formed transverse dam-member disposed across said channel to close the same, the outer surfaces of said dam-members being flush with the planes of said ends to provide mutually and closely contacting faces.

3. A packing-ring comprising a circular main body having integrally formed concentrically disposed side flanges providing an intermediate concentric channel, said body and its flanges being split transversely and obliquely at one point to provide separable ends, and each end having an integrally formed transverse dam-member disposed across said channel to close the same, the outer surfaces of said dam-members being flush with the planes of said ends to provide mutually and closely contacting faces, the inner surface of each of said dam-members having a V-shaped vertical groove provided therein.

4. A packing-ring comprising a circular main body having integrally formed concentrically disposed outwardly flaring side flanges providing an intermediate concentric channel, the free edges of said flanges having outwardly chamfered portions providing flexible lips, said body and its flanges being split transversely and obliquely at one point to provide separable ends, and each end having an integrally formed transverse dam-member disposed across said channel to close the same.

5. A packing-ring comprising a circular main body having integrally formed concentrically disposed outwardly flaring side flanges providing an intermediate concentric channel, the free edges of said flanges having outwardly chamfered portions providing flexible lips, said body and its flanges being split transversely and obliquely at one point to provide separable ends, and each end having an integrally formed transverse dam-member disposed across said channel to close the same, the outer surfaces of said dam-members being flush with the planes of said ends to provide mutually and closely contacting faces.

6. A packing-ring comprising a circular main body having integrally formed concentrically disposed outwardly flaring side flanges providing an intermediate concentric channel, the free edges of said flanges having outwardly chamfered portions providing flexible lips, said body and its flanges being split transversely and obliquely at one point to provide separable ends, and each end having an integrally formed transverse dam-member disposed across said channel to close the same, the outer surfaces of said dam-members being flush with the planes of said ends to provide mutually and closely contacting faces, the inner surface of each of said dam-members having a V-shaped vertical groove provided therein.

In testimony that I claim the invention set forth above I have hereunto set my hand this 1st day of March, 1919.

ANDREW L. HATFIELD.

Witnesses:
GEORGE D. RICHARDS,
FREDK. C. FRAENTZEL.